(12) United States Patent
Wentinck et al.

(10) Patent No.: US 7,008,597 B1
(45) Date of Patent: Mar. 7, 2006

(54) CATALYTIC REACTOR

(75) Inventors: Hendrik Martinus Wentinck, Amsterdam (NL); Jacobus Antonius Jozef Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/868,791

(22) PCT Filed: Dec. 22, 1999

(86) PCT No.: PCT/EP99/10447

§ 371 (c)(1),
(2), (4) Date: Jun. 21, 2001

(87) PCT Pub. No.: WO00/38828

PCT Pub. Date: Jul. 6, 2000

(30) Foreign Application Priority Data

Dec. 29, 1998 (EP) .................................. 98310768

(51) Int. Cl.
*B01J 8/04* (2006.01)
(52) U.S. Cl. .................................................. 422/198
(58) Field of Classification Search ................ 422/105, 422/107, 108, 110, 111, 211, 222, 220, 198
See application file for complete search history.

(56) References Cited

U.S. PATENT DOCUMENTS

| | | | | |
|---|---|---|---|---|
| 2,443,071 A | * | 6/1948 | Honerkamp et al. | ..... 137/625.3 |
| 4,134,425 A | * | 1/1979 | Gussefeld et al. | ....... 137/625.3 |
| 4,225,111 A | * | 9/1980 | Stahle | .......................... 251/87 |
| 5,149,464 A | | 9/1992 | Green et al. | ................. 252/373 |
| 5,771,476 A | | 6/1998 | Mufford et al. | ................ 701/22 |
| 5,776,421 A | | 7/1998 | Matsumura et al. | |

FOREIGN PATENT DOCUMENTS

| | | |
|---|---|---|
| DE | 1 138 290 B | 12/1959 |
| DE | 11 38 290 B | 12/1959 |
| DE | G92 02 798.9 U | 4/1992 |
| DE | 42 22 162 A | 1/1993 |
| EP | 298.369 | 1/1989 |
| EP | 303.438 | 2/1989 |
| GB | 1 367 941 A | 9/1974 |
| GB | 2 303 860 A | 3/1997 |
| JP | 62 087401 A | 4/1987 |
| WO | 92/11199 | 7/1992 |
| WO | 99/19249 | 4/1999 |

OTHER PUBLICATIONS

R. A. Lemons, Journal of Power Sources 29 (1990), pp. 251-264.

* cited by examiner

*Primary Examiner*—Jonathan Johnson

(57) ABSTRACT

The invention relates to a reactor (1), suitable for the catalytic conversion of a feed mixture which is capable of explosion and/or ignition, comprising a feed supply chamber (2), an effluent discharge chamber (3), a catalyst bed (4) having an upstream surface (5) and a downstream surface (6) which is in fluid communication with the effluent discharge chamber (3), and means for covering part of the upstream surface (5) that partly confine the feed supply chamber (2), wherein the feed supply chamber (2) has, during normal operation, no zones where the fluid flow is stagnant, to the use of such a reactor (1), in particular a catalytic partial oxidation process, and to transport means provided with such a reactor (1).

4 Claims, 5 Drawing Sheets

CATALYTIC REACTOR

Figure 1:
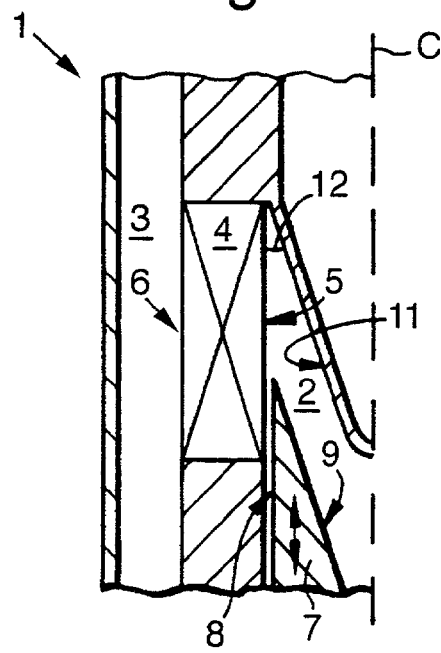
Figure 2:
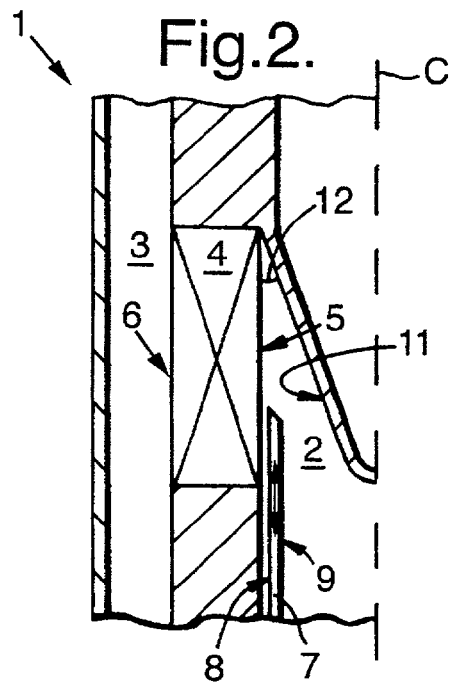
Figure 3:
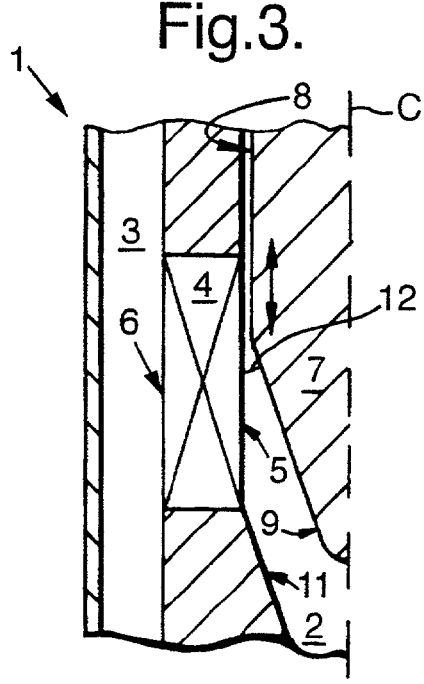
Figure 4:
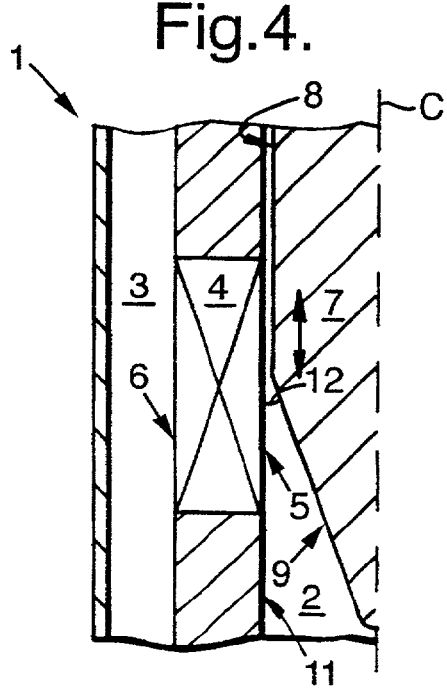

The present invention relates to a reactor wherein part of the upstream surface of the catalyst bed can be covered, to the use of such a reactor in a process for the catalytic conversion of a feed mixture which is capable of ignition or explosion, and to transport means provided with the reactor.

An example of a process for the catalytic conversion of a feed mixture which is capable of ignition or explosion is the catalytic partial oxidation of hydrocarbonaceous feedstocks, in particular hydrocarbons. The partial oxidation of paraffinic hydrocarbons is an exothermic reaction represented by the equation:

$$C_nH_{2n+2} + n/2\ O_2 + n\ CO + (n+1)\ H_2$$

There is literature in abundance on the catalysts and the process conditions for the catalytic partial oxidation of gaseous hydrocarbons, in particular methane. Reference is made, for instance, to EP-A-303 438, U.S. Pat. No. 5,149,464, and International patent application WO 92/11199.

The hydrogen produced by the catalytic partial oxidation process of hydrocarbonaceous feedstocks can suitably be used as feed for a fuel cell. In fuel cells, hydrogen and oxygen are converted into electricity and water. Fuel cell technology is well known in the art.

One of the most challenging applications of fuel cells is in transportation. Transport means, such as automotive vehicles and crafts, powered by fuel cells are under development. The oxygen needed for the fuel cell may be obtained from the ambient air, the hydrogen feed could be obtained from a hydrogen fuel tank but is preferably produced on-board, for example by catalytic reforming of methanol. The on-board production of hydrogen by catalytic reforming of methanol has been proposed, for example by R. A. Lemons, Journal of Power Sources 29 (1990), p 251–264.

Recently, the on-board production of hydrogen by a catalytic partial oxidation process, for example as described in WO99/19249 has been proposed as an alternative for steam reforming of methanol. An important advantage of this catalytic partial oxidation process is its flexibility towards the choice of fuel.

It is important for a power system in transportation applications, that it is able to vary the power output with a factor of at least about 60, preferably of at least 100. Several systems for controlling the power output of fuel cell systems for transportation applications are under development. In U.S. Pat. No. 5,771,476, for example, a system for controlling the power output of a fuel cell is disclosed, wherein the supply of a reactant gas, such as air, to the fuel cell unit is controlled.

Alternatively, in the case of a fuel cell system having an on-board hydrogen-producing unit, the power output may be controlled by regulating the quantity of hydrogen produced. In a catalytic conversion process, the amount of hydrogen produced is directly proportional to the moles of feed mixture that are converted, provided that the process conditions and the composition of the feed mixture are kept constant.

If the supply of feed mixture to a catalyst bed would be varied in the range between the minimum amount desired and up to 60 times that amount, large variations in superficial velocity, residence time, and pressure of the feed mixture would occur. These large variations may result in problems, especially at the lowest feed throughput. Especially in the case of a feed mixture that is capable of explosion and/or ignition, such as in the catalytic conversion of a mixture of hydrocarbons and an oxygen-containing gas, the low superficial velocity of the feed mixture at low throughputs could result in a residence time of the feed mixture upstream of the catalyst which is greater than the auto-ignition delay time, thus causing auto-ignition or particle induced ignition, and in flash-back of flames from the catalyst bed.

It is known to achieve a large variations in output by using a plurality of catalytic reactors, each containing a catalyst provided with a feed supply system, and varying the number of reactors which are turned on, whilst keeping the feed throughput per reactor essentially constant. It will be appreciated that such multi-reactor systems are relatively expensive, since a plurality of feed supply systems, including the flow control equipment, are needed. Moreover, in such a system the output can only be varied stepwise and not continuously. Therefore, there is a need in the art for catalytic reactors that can achieve large variations in output in a single reactor.

It is also important that the reactor comprises a cooling system that is capable of dealing with a varying throughput of hot conversion product, such as hot synthesis gas in the case of a catalytic partial oxidation process. Suitably, the hot conversion product can be cooled by heat exchanging it against air or air/steam mixtures in flexible corrugated metal tubes. Such tubes are known and commercial available, for example from Witzenmann GmbH in Germany. The use of these tubes as heat exchanger is described in EP-A-298 369. Because of their flexibility, the tubes can accommodate thermal stresses due to a varying throughput of hot conversion product.

In view of the above, the problem to be solved is how to achieve, in a single reactor for the catalytic conversion of a feed mixture that is capable of explosion and/or ignition, a large variation in the quantity of conversion products by varying the throughput of the feed mixture, whilst avoiding uncontrolled gas-phase reactions, such as auto-ignition or particle induced ignition of the feed mixture upstream of the catalyst and flash-back of flames from the catalyst bed.

It has now been found that the above-mentioned problem can be solved by using a reactor wherein part of the upstream surface of the catalyst bed can be covered as a function of the throughput of feed mixture in such a way that, during normal operation, the space upstream of the catalyst bed, i.e. the feed supply chamber, has no zones wherein the fluid flow is stagnant. Reference herein to zones wherein the fluid flow is stagnant is to zones wherein the fluid is hardly exchanged with fluid from surrounding zones, resulting in a relatively long residence time of the fluid in that zone, i.e. relatively long compared to the average residence time of fluid in the feed supply chamber. Typically, the residence time of the fluid in zones wherein the flow is stagnant exceeds 5 times the average residence time of the fluid in the feed supply chamber.

Accordingly, the present invention relates to a reactor, suitable for the catalytic conversion of a feed mixture which is capable of explosion or ignition, which reactor comprises a feed supply chamber, an effluent discharge chamber, a catalyst bed having an upstream surface and a downstream surface which is in fluid communication with the effluent discharge chamber, and means for covering part of the upstream surface that partly confine the feed supply chamber, wherein the feed supply chamber has, during normal operation, no zones where the fluid flow is stagnant.

The uncovered part of the upstream surface of the catalyst bed is in fluid communication with the feed supply chamber. In order to be able to achieve a sufficiently large variation in the quantity of catalytic conversion products, the ratio between the maximum and minimum value for the uncovered area of the upstream surface area is preferably at least 5, more preferable at least 10, most preferably at least 20.

Reference herein to a catalyst bed is to a permeable fixed arrangement, for example a fixed bed of particles, a porous monolithic structure such as a ceramic or metal foam or honeycomb, or another permeable fixed arrangement, such as arrangements comprising metal gauzes or wires. Alternatively, a single reactor may comprise more than one catalyst bed, for example a plurality of ceramic foams. In the case of a plurality of catalyst beds in a single reactor, reference to the surface of the catalyst bed is to the total surface of all catalyst beds. Feed will be supplied at the upstream side of the catalyst bed, and after catalytic conversion of the feed into effluent, effluent will be discharged at the downstream side of the catalyst bed.

The feed supply chamber is defined as the space upstream of the catalyst bed wherein the reactants are supplied. This space is confined by the uncovered upstream surface of the catalyst bed, one or more surfaces of the means for covering part of the upstream surface, and, optionally, one or more other surfaces of the reactor.

To avoid that, during normal operation of the reactor according to the invention, the feed supply chamber has zones where the fluid flow is stagnant:
a) part of the upstream surface of the catalyst bed is covered in such a way that, at any setting of the means for covering part of the upstream surface, the shape of the feed supply chamber is such that no dead space(s) occur, i.e. during normal operation the fluid in the feed supply chamber is flowing in a plug flow regime; or
b) the fluid in the feed supply chamber is forced to swirl.

A combination of a) and b) may be applied in order to avoid zones where the fluid flow is stagnant. It will be appreciated that the requirement to the shape of the feed supply chamber at each setting of the means for covering part of the upstream surface can be somewhat relaxed if, under normal operation, the fluid feed mixture is forced to swirl.

Thus, the feed supply chamber of the reactor of the invention is preferably equipped with means for swirling the feed mixture, preferably in tangential direction with respect to the central longitudinal axis of the catalyst bed. The means for swirling the feed mixture may be any suitable means, for example a fan, such as the fan of a compressor of a turbocharger.

In those embodiments of the reactor according to the present invention wherein, during normal operation, the shape of the feed supply chamber is such that the fluid in the feed supply chamber is flowing in a plug flow regime, it is required that the residence time of the feed mixture in the feed supply chamber is below the auto-ignition delay time and that the superficial velocity of the feed mixture at the upstream catalyst surface is high enough to prevent flashback. The feed supply chamber may have a constant volume, i.e. a volume that is not varied as a function of feed throughput, provided that the volume is small enough to warrant that the residence time and the superficial velocity of the feed mixture meet the above requirements at the smallest required feed throughput. It is preferred that the volume of the feed supply chamber is regulated as a function of the uncovered upstream surface area and feed throughput. More preferably, the volume of the feed supply chamber is regulated in such a way that the residence time of the fluid in the feed supply chamber is varied within a factor of at most 5, upon variations in feed throughput of a factor 60, and that the superficial velocity is typically kept above 1 m/s for the catalytic partial oxidation process described below.

The invention will now be illustrated in a non-limiting manner with reference to the schematic FIGS. 1 to 7. The Figures are not drawn to scale. FIGS. 1 to 7 each show a different embodiment of the present invention.

FIGS. 1 to 4 each show part of a longitudinal section of a reactor 1 according to the present invention, which reactor 1 is rotation symmetrical around central longitudinal axis C. Reactor 1 comprises a feed supply chamber 2, an effluent discharge chamber 3, a cylindrical catalyst bed 4, having an upstream surface 5 and a downstream surface 6, and means for covering part of the upstream surface 5 comprising a body 7 which is moveable parallel to the upstream surface 5. The body 7 has a first surface 8 directed to the upstream surface 5 and a second surface 9 partly confining the feed supply chamber 2. Reactor 1 further comprises a surface 11 which is partly confining the feed supply chamber 2. FIGS. 1 to 4 each show a position of the body 7 at which part of the upstream surface 5 of catalyst bed 4 is covered by the first surface 8 of body 7.

In all embodiments shown in FIGS. 1 to 4, the shape of the feed supply chamber 2 is such that, at any setting of the body 7 and thus at any size of the uncovered upstream surface area, essentially no dead space(s) occur in the feed supply chamber. Thus, during normal operation, the fluid in the feed supply chamber is essentially flowing in a plug flow regime, i.e. without occurrence of substantial back mixing.

In order to avoid, at any setting of the means for covering part of the upstream surface, that the feed supply chamber has zones where the fluid flow is stagnant, it is preferred that the feed supply chamber has a flow defining surface having an angle with the upstream surface 5 of the catalyst bed 4 which is smaller than 70°, more preferably smaller than 60°, even more preferably smaller than 45°. Reference herein to a flow defining surface is to a surface that defines the direction of the flow since the fluid flow is deflected by the flow defining surface to the upstream surface of the catalyst bed. In the embodiments shown in FIGS. 1 and 2, the flow defining surface is referred to with reference numeral 11; and in FIGS. 3 and 4 with reference numeral 9. The angle between the flow defining surface and the upstream surface is referred to with reference numeral 12. In FIGS. 1 to 4, the angle 12 is about 20°.

It is preferred that the feed supply chamber further has a flow guiding surface that is substantially parallel to the flow defining surface. Substantially parallel must be construed as having an angle of not more than 15° with the flow defining surface, preferably not more than 10°, more preferably as having an angle of 0°. The embodiments of the reactor of the invention shown in FIGS. 1 and 3 comprise a feed supply chamber 2 having a flow guiding surface (surface 9 in FIG. 1; surface 11 in FIG. 3) that is parallel to the flow defining surface (surface 11 in FIG. 1; surface 9 in FIG. 3).

Although the shape of the feed supply chamber 2 of reactor 1 as shown in FIGS. 1 to 4 is such that no dead spaces would occur at any setting of the body 7, a means for swirling (not shown) the feed mixture may be advantageously applied.

Figure 5A:
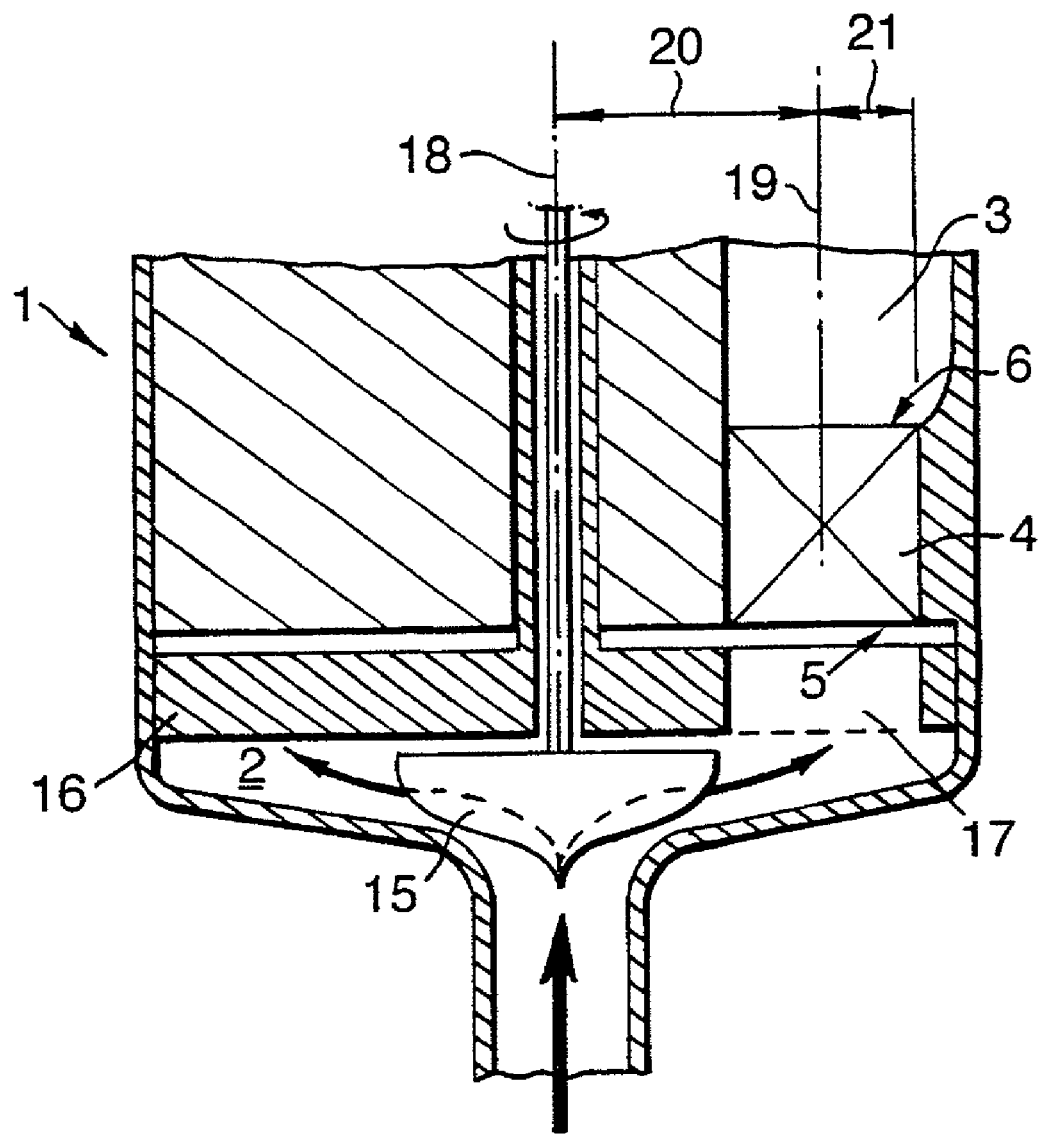

FIG. 5a shows a longitudinal section of part of a reactor 1 comprising three separate catalyst beds 4 (one of the three beds is shown), and means 15 for swirling the feed mixture in tangential direction. The means for covering part of the upstream surface 5 comprise a rotable disc 16 having three openings 17 excentric to the axis of rotation 18 (one of the three openings is shown). In the embodiment of FIG. 5, means 15 is the fan of a compressor of a turbocharger.

Figure 5B:
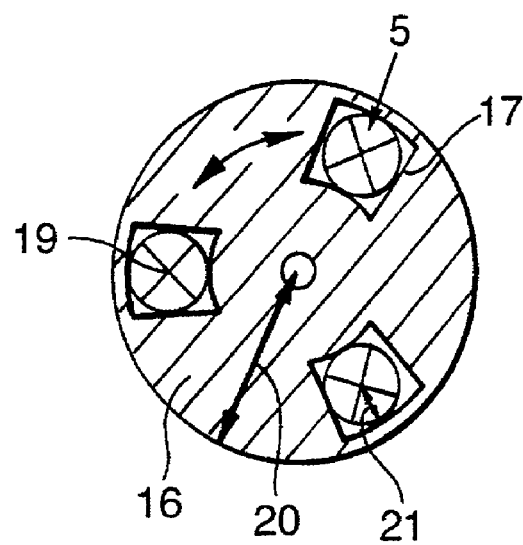
Figure 5C:
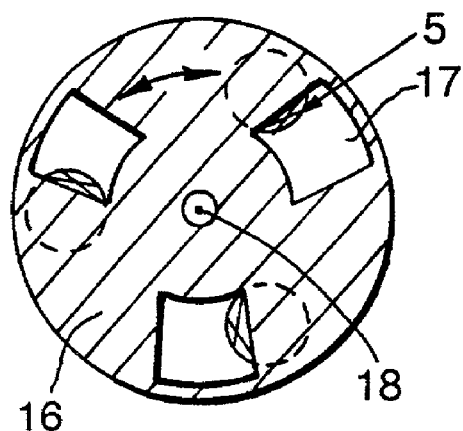
Figure 7C:
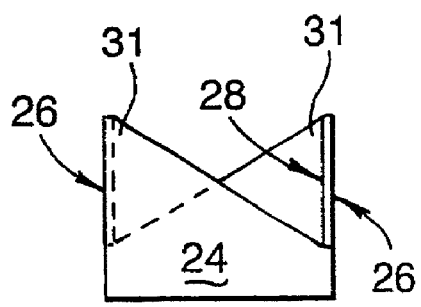
Figure 7D:
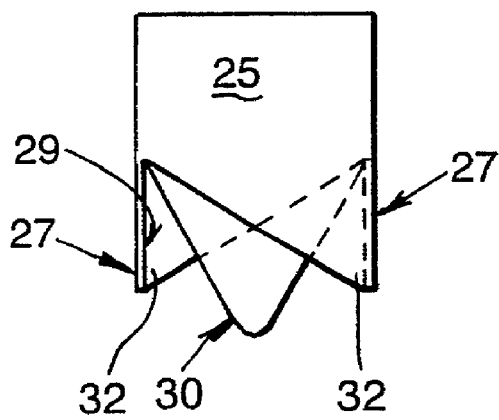

Both FIGS. 5b and 5c separately show the disc 16 and its position with respect to the upstream surfaces 5 of the three catalyst beds. FIG. 5b shows the position of the disc 16 wherein the uncovered area of upstream surface 5 has its maximum value. FIG. 5c shows the position of disc 16 wherein a large part of the upstream surface 5 is covered.

The axis of rotation 18 of disc 16 is parallel to and excentric with respect to the longitudinal axis 19 of any of the catalyst beds. The radius 20 of disc 16 is larger than the sum of the radius 21 of any of the catalyst beds and the distance between the longitudinal axis 19 and the axis of rotation 18 of disc 16. Preferably, the distance between the centre of the opening 17 and the axis of rotation 18 of the disc 16 is equal to the distance between the longitudinal axis 19 of the catalyst bed and the axis of rotation 18 of the disc 16, such as is the case in the embodiment of FIG. 5.

It will be appreciated that in the reactor 1 as shown in FIG. 5, during normal operation, zones where the fluid flow is stagnant would occur in the feed supply chamber 2 if the feed fluid would not be forced to swirl.

Figure 6A:
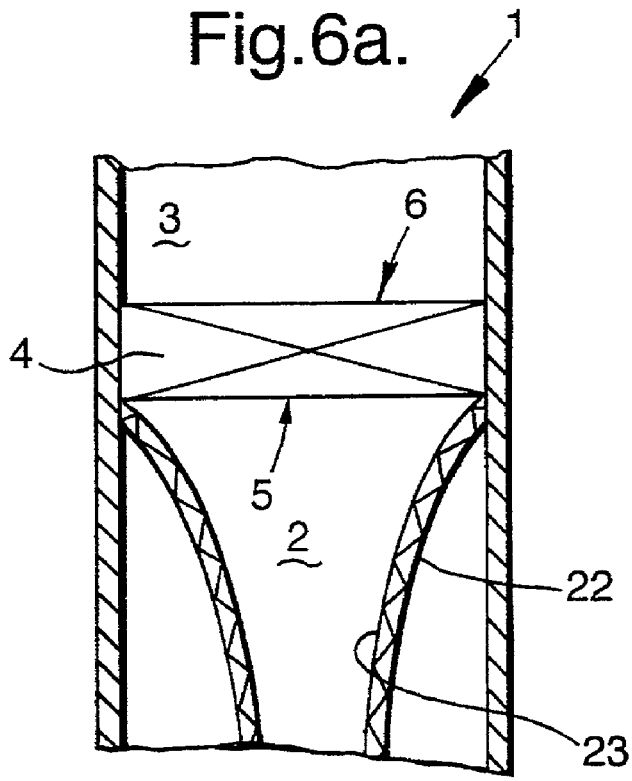
Figure 6B:
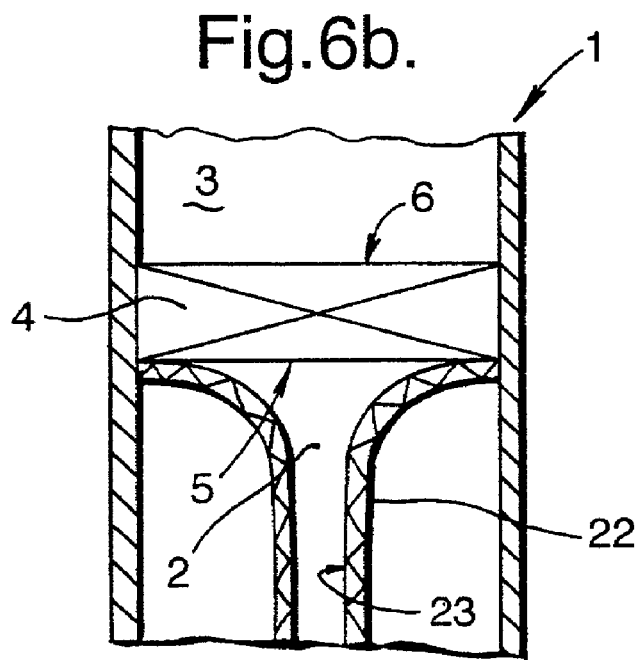

FIG. 6 shows an embodiment of the invention wherein the means for covering part of the upstream surface 5 comprises a flexible wall 22 having a surface 23 that partly defines the feed supply chamber 2 and is capable of partly covering the upstream surface 5 of the catalyst bed 4. FIG. 6a shows the position of the flexible wall 22 wherein the uncovered area of the upstream surface 5 is maximum; FIG. 6b shows a position of the flexible wall 22 wherein a part of the upstream surface 5 is covered by the surface 23. Suitable flexible walls may consist of any flexible high-temperature resistant material, for example a metal foil. Corrugated metal foils are particularly suitable.

In the embodiment of FIG. 6, a means for swirling the feed mixture (not shown) may be applied.

In the embodiments shown in FIGS. 1 to 6, the same part of the upstream surface 5 of the catalyst bed 4 is exposed to the feed at low throughput. Thus, the part of the surface that is exposed at low throughputs will deteriorate or deactivate more quickly than the part that is only exposed at high feed throughput. Therefore, it is advantageous when the part of the upstream surface that is exposed at low throughput can be varied. This can, for example, be achieved by means of means for covering part of the upstream surface comprising two moveable bodies.

Figure 7A:
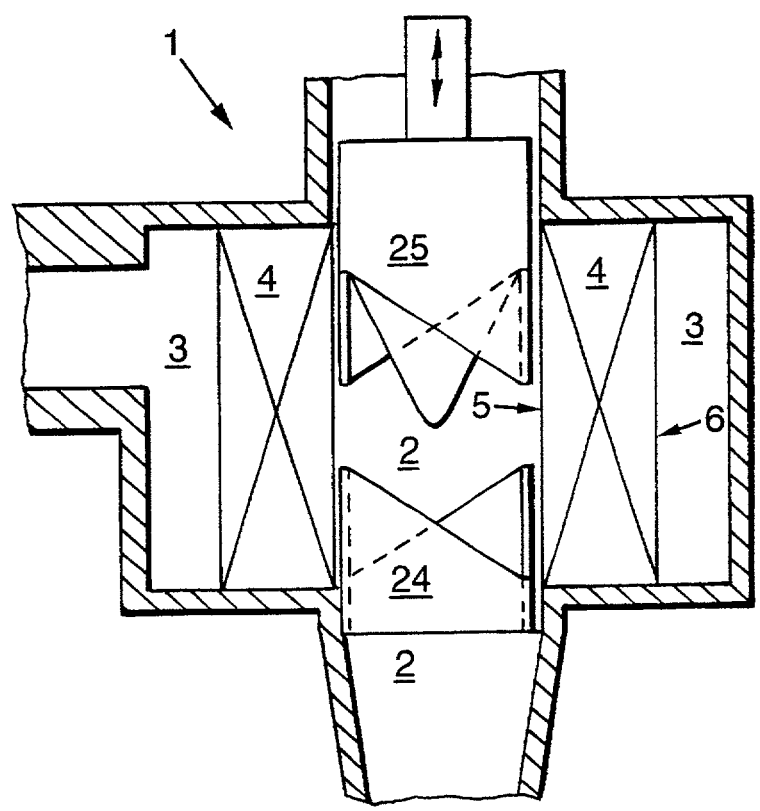
Figure 7B:
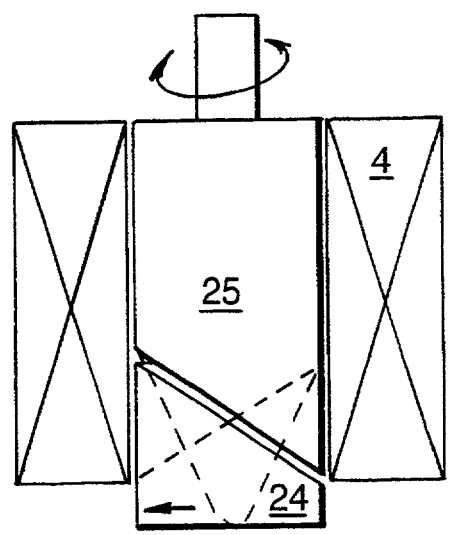

FIGS. 7a and 7b show a reactor 1 comprising a hollow cylindrical catalyst bed 4 having an upstream surface 5 at the inside of the cylindrical bed. The means for covering part of the upstream surface 5 comprise two bodies 24, 25 which are moveable parallel to the upstream surface 5. Bodies 24 and 25 are shown in more detail in FIGS. 7c and 7d, respectively. Both bodies have a first surface 26, 27 that is directed to the upstream surface 5 of the catalyst bed 4, and a second surface 28, 29 that is partly confining the feed supply chamber 2. Further, the body 25 comprises a flow defining surface 30 having an angle with the upstream surface 5 which is smaller than 70°. Both bodies 24, 25 are provided with projections 31,32 that can grip into each other. In the embodiment shown in FIGS. 7a and 7b, the projections are in the shape of saw teeth. Alternative shapes, however, may be applied. The uncovered area of the upstream surface 5 can be regulated by moving body 25 in the direction indicated by the arrow on body 25 in FIGS. 7a and 7b. The part of the upstream surface 5 that is uncovered at low throughput can be varied by moving body 24 in the direction indicated by the arrow on body 24 in FIG. 7b. The embodiment shown in FIGS. 7a and 7b is preferable equipped with means (not shown) for swirling the feed mixture in order to avoid that the feed supply chamber 2 has zones where the fluid flow is stagnant.

In the reactor according to the invention, the distance between the covered upstream surface of the catalyst bed and the surface covering it is preferably such that flames cannot be sustained between the two surfaces. Suitably, this distance is not exceeding three times the quenching distance, preferably not exceeding one time the quenching distance. The quenching distance is defined as the distance within which two walls must be brought to prevent flash-back, i.e. flames cannot be sustained at this distance, they are quenched or extinct. For a given laminar flame velocity and operating pressure, the quenching distance can be calculated by methods known in the art. The laminar flame velocity depends, among others, on the composition and temperature of the feed mixture. Estimation methods for the flame velocity are known in the art. For example, for a catalytic partial oxidation process as described below, with a oxygen-to-carbon ratio of about 0.5, performed at a pressure of 6 bar (absolute), wherein the laminar flame velocity of the feed mixture is about 0.5 m/s and the temperature of the feed mixture just upstream of the surface of the catalyst bed is about 500° C., the quenching distance is about 0.5 mm.

The means for covering part of the upstream surface suitably consist of inert, high-temperature resistant material, such as metals or refractory oxides. Metal alloys, such as high-chromium steel alloys and fecralloy-type materials are particularly suitable. The moveable body or bodies may be moved with respect to the upstream surface by any suitable means known in the art. The body may be moved by means of the fluid flow.

The catalyst bed may have any suitable shape. Preferably, the catalyst bed is a catalyst-containing cylindrical arrangement, more preferably a circle cylindrical arrangement, having an inner and an outer surface. The upstream surface of the catalyst bed may be either the inner or the outer surface of the cylindrical arrangement, preferably the inner surface, since this minimises the volume of the feed supply chamber and thus minimises the risks for ignition and/or explosion.

In a further aspect the present invention relates to a process for the catalytic conversion of a fluid feed mixture which is capable of ignition or explosion, wherein the fluid feed mixture is contacted with a catalyst bed retained in the reactor as described hereinbefore. In particular, the invention relates to a process for the catalytic partial oxidation of a hydro-carbonaceous feedstock, wherein a feed mixture comprising the hydrocarbonaceous feedstock and an oxygen-containing gas is contacted with a catalyst bed retained in the reactor as described hereinbefore.

The hydrocarbonaceous feedstock suitably comprises hydrocarbons and/or oxygenates which are gaseous under the condition prevailing at the in the catalyst bed during normal operation. The feedstock may contain compounds that are liquid and/or compounds that are gaseous under standard conditions of temperature and pressure (i.e. at 0° C. and 1 atm.). Oxygenates are defined as molecules containing apart from carbon and hydrogen atoms at least 1 oxygen atom which is linked to either one or two carbon atoms or to a carbon atom and a hydrogen atom, such as alcohols, ethers, acids and esters.

The oxygen-containing gas may be air, substantially pure oxygen, or oxygen-enriched air, preferably air.

The feed comprises the hydrocarbon and/or oxygenate feedstock and the oxygen-containing gas in amounts sufficient to give an oxygen-to-carbon ratio in the range of from 0.3 to 0.8, preferably of from 0.45 to 0.75, more preferably in the range of from 0.45 to 0.65. If oxygenate feedstocks are used, e.g. methanol, oxygen-to-carbon ratios below 0.3 can suitably be used. References to the oxygen-to-carbon ratio refer to the ratio of oxygen in the form of molecules ($O_2$) to carbon atoms present in the hydrocarbon and/or oxygenate feedstock. The feed mixture may comprise steam and/or carbon dioxide. If steam is present in the feed mixture, the steam-to-carbon ratio (that is the ratio of molecules of steam ($H_2O$) to carbon atoms in the feedstock) is preferably in the range of from above 0.0 to 3.0, more preferably of from above 0.0 to 2.0.

The catalytic partial oxidation process is preferably operated at a temperature in the range of from 750 to 1500° C., more preferably in the range of from 800 to 1350° C. Temperatures in the range of from 850 to 1300° C. are particularly suitable. Reference herein to temperature is to the temperature in the top (i.e. the upstream side) layer of the catalyst bed.

The catalytic partial oxidation process is preferably operated at a pressure in the range of from 2 to 100 bar (absolute), preferably in the range of from 3 to 50 bar (absolute), more preferably of from 5 to 30 bar (absolute).

In the catalytic partial oxidation process of the invention, the feed throughput, and thus the gas hourly space velocity (expressed as normal liters of gas per kilogram of catalyst per hour; normal liters are liters at STP, i.e. 0° C. and 1 atm.), is varied. At maximum feed throughput, i.e. typically at 0% coverage of the upstream surface of the catalyst bed, the feed mixture is preferably provided at gas hourly space velocities which are in the range of from 20,000 to 10,000,000 Nl/kg/h, more preferably in the range of from 50,000 to 5,000,000 Nl/kg/h, even more preferably in the range of from 100,000 to 3,000,000 Nl/kg/h.

Catalyst compositions suitable for use in the catalytic partial oxidation process are known in the art. Such catalysts generally comprise, as active component, a metal selected from Group VIII of the Periodic Table of the Elements. References in this specification to the Periodic Table of the Elements are to the CAS version, as published in the CRC Handbook of Chemistry and Physics, 68th Edition. Catalysts comprising, as the catalytically active component, a metal selected from rhodium, iridium, palladium and platinum are preferred. Catalysts comprising rhodium or iridium are most preferred.

The catalytically active metal is most suitably supported on a carrier, such as refractory oxide particles, ceramic or metal monolithic structures, or metallic arrangements. Suitable carrier materials are well known in the art and include refractory oxides, such as silica, alumina, titania, zirconia and mixtures thereof and metals such as high-alloy, alumina-containing steel, for example fecralloy-type materials.

The catalyst may comprise the catalytically active metal in any suitable amount to achieve the required level of activity. Typically, the catalyst comprises the active metal in an amount in the range of from 0.01 to 20% by weight, preferably from 0.02 to 10% by weight, more preferably from 0.1 to 7.5% by weight.

Hydrogen or a mixture of hydrogen with other gases, prepared by the catalytic partial process of this invention may be particularly suitable for use as a combustible fuel, either directly or indirectly.

The preferred process is suitably used to prepare hydrogen from any hydrocarbonaceous feedstock, especially for the on-board production of hydrogen in fuel cell powered transport means, such as automotive vehicles and crafts.

Accordingly, the present invention also relates to transport means provided with the reactor of this invention.

What is claimed is:

1. A reactor suitable for the catalytic conversion of a feed mixture which is capable of explosion or ignition comprising: a feed supply chamber, an effluent discharge chamber, a catalyst bed having an upstream surface and a downstream surface which is in fluid communication with the effluent discharge chamber, and means for covering part of the upstream surface that partly confine the feed supply chamber comprising a rotable disc having an axis of rotation parallel to and excentric with respect to the central longitudinal axis of the catalyst bed, which disc has a radius which is larger than the sum of the radius of the catalyst bed and the distance between the longitudinal axis of the catalyst bed and the axis of rotation of the discs, and which disc has at least one opening excentric to the axis of rotation, wherein the feed supply chamber has, during normal operation, no zones where the fluid flow is stagnant.

2. The reactor of claim 1, wherein the uncovered area of the upstream surface can be varied between a maximum and a minimum value, wherein the ratio between the maximum and the minimum value is at least 5.

3. The reactor of claim 1, wherein the feed supply chamber is equipped with means for swirling the feed mixture.

4. The reactor of claim 1, wherein the distance between the center of the opening and the rotation axis of the disc is equal to the distance between the longitudinal axis of the catalyst bed and the rotation axis of the disc.

* * * * *